United States Patent [19]
Inagaki et al.

[11] Patent Number: 5,810,456
[45] Date of Patent: Sep. 22, 1998

[54] BRAKE SYSTEM FOR VEHICLE

[75] Inventors: Hiromi Inagaki; Yoshimichi Kawamoto; Kazuya Sakurai; Wataru Saito, all of Wako; Masaaki Kitazawa, Ueda, all of Japan

[73] Assignees: Honda Giken Kogyo Kabushiki Kaisha, Tokyo; Nissin Kogyo Co., Ltd., Nagano-ken, both of Japan

[21] Appl. No.: 620,206

[22] Filed: Mar. 22, 1996

[30] Foreign Application Priority Data

Mar. 23, 1995 [JP] Japan .................................. 7-064593

[51] Int. Cl.$^6$ ........................................................ B60T 8/40
[52] U.S. Cl. ........................................................ 303/116.1
[58] Field of Search ........................... 303/117.1, 113.1, 303/113.2, 116.1, 119.1, 115.2, 901; 364/424.01, 426.01, 426.02, 426.07

[56] References Cited

U.S. PATENT DOCUMENTS

| | | | |
|---|---|---|---|
| 4,715,666 | 12/1987 | Farr | 303/116 |
| 5,372,412 | 12/1994 | Yagi | 303/115.2 |
| 5,431,489 | 7/1995 | Lee | 303/117.1 |
| 5,544,947 | 8/1996 | Nishii | 303/900 |

FOREIGN PATENT DOCUMENTS 5-65060   3/1993   Japan .

*Primary Examiner*—Robert J. Oberleitner
*Assistant Examiner*—C. J. Bartz
*Attorney, Agent, or Firm*—Nikaido, Marmelstein, Murray & Oram LLP

[57] ABSTRACT

A brake system for a vehicle includes a liquid pressure generating device for generating a liquid pressure dependent upon a manual operation, actuators having output ports for outputting a liquid pressure dependent upon an electrical command signal from a controller, and which are adapted to be connected to a reservoir when the actuators are non-operative, and switchover valves switchable between a state in which wheel brakes are connected to the liquid pressure generating device, and a state in which the wheel brakes are connected to the actuators. In the brake system, on-off valves are connected between the output ports of the actuators and the switchover valves, and are opened when the liquid pressures output from the actuators is equal to or higher than a predetermined value.

3 Claims, 2 Drawing Sheets

BRAKE SYSTEM FOR VEHICLE

BACKGROUND OF THE INVENTION

1. Field of the Invention

The present invention relates to a brake system for a vehicle, comprising a liquid pressure generating means for generating a liquid pressure dependent upon a manual operation; an actuator which includes an output port and is capable of outputting a liquid pressure dependent through the output port based upon an electrical command signal from a controller, the output port communicating with a reservoir when the actuator is non-operative; and switchover valve means switchable between a state in which a wheel brake is connected to the liquid pressure generating means, and a state in which the wheel brake is connected to the actuator.

2. Description of the Related Art

In a prior art brake system, for example, as in Japanese Patent Application Laid-Open No. 65060/93, the switchover valve is switched between a state in which the actuator is connected to the wheel brakes when the operation of the actuator is normal, and a state in which the master cylinder is connected to the wheel brake when the operation of the actuator becomes abnormal. However, if the seal of the switchover valve fails when the master cylinder is connected to the wheel brakes by the switchover valve, the working liquid leaks from the master cylinder toward the actuator.

SUMMARY OF THE INVENTION

Accordingly, it is an object of the present invention to provide a brake system for a vehicle, which is designed so that the leakage of the working liquid from the wheel brakes or the liquid pressure generating means toward the actuator can be reliably prevented.

To achieve the above object, according to the present invention, there is provided a brake system for a vehicle, comprising a liquid pressure generating means for generating a liquid pressure dependent upon a manual operation, an actuator which includes an output port and is capable of outputting a liquid pressure dependent through the output port based upon an electrical command signal from a controller, the output port communicating with a reservoir when the actuator is non-operative; and a switchover valve means which is switchable between a state in which a wheel brake is connected to the liquid pressure generating means, and a state in which the wheel brake is connected to the actuator, wherein the brake system further includes an on-off valve which is interposed between the output port of the actuator and the switchover valve means and which is opened when an output liquid pressure from the actuator is equal to or higher than a predetermined value.

With the above feature of the present invention, when the wheel brakes are connected to the liquid pressure generating means and the actuators are non-operative or incapable of being operated, the wheel brakes and the actuators are disconnected by the on-off valves. Thus, it is possible to reliably prevent the working liquid from leaking from the wheel brakes or the liquid pressure generating means toward the actuators due to the failure of the seals of the switchover valve means.

The above and other objects, features and advantages of the invention will become apparent from the following detailed description of a preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
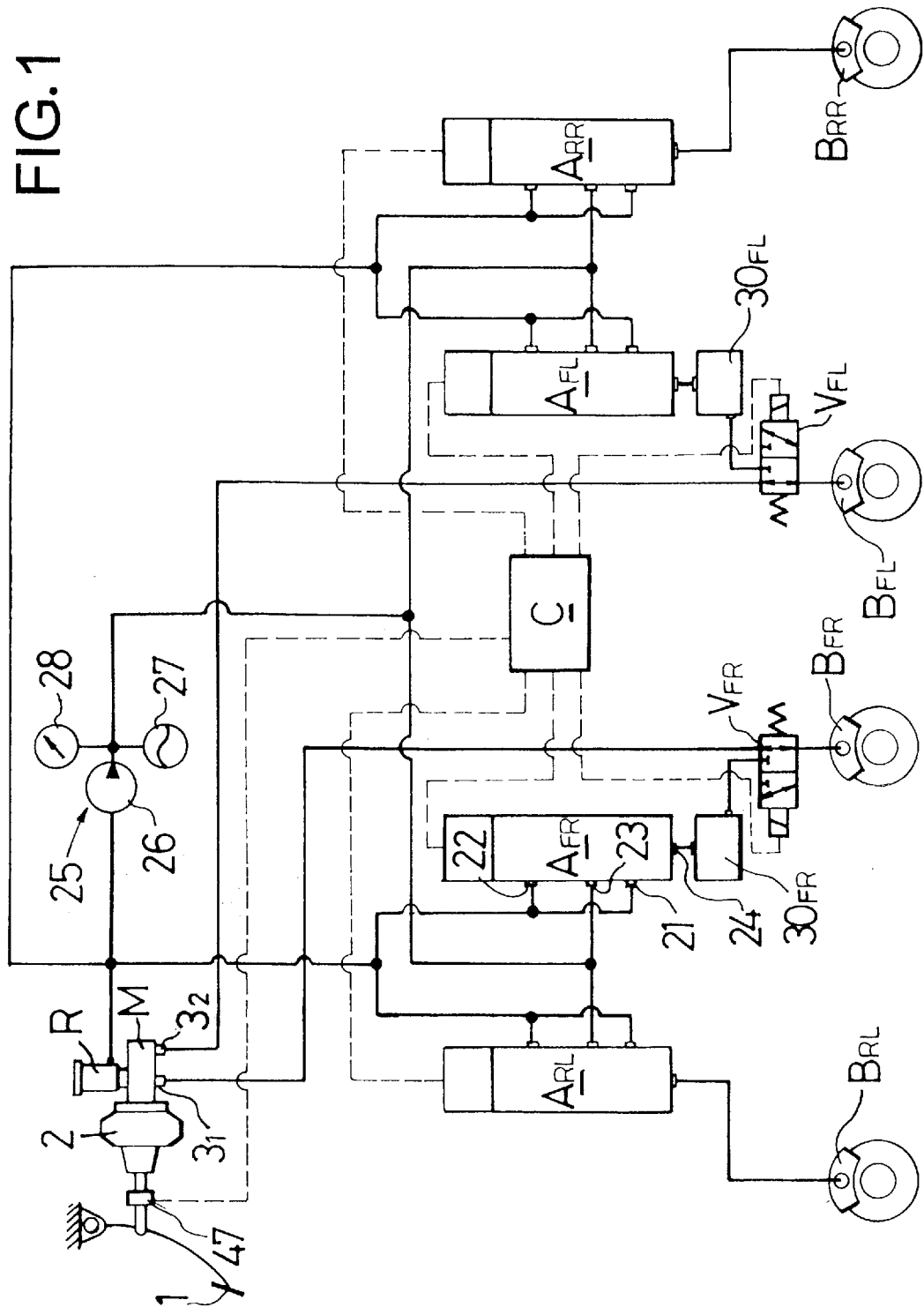
FIG. 1 is a diagrammatic illustration of the arrangement of a brake system for a vehicle according to a preferred embodiment of the present invention.

Referring first to FIG. 1, a left front wheel brake $B_{FL}$, a right front wheel brake $B_{FR}$, a left rear wheel brake $B_{RL}$ and a right rear wheel brake $B_{RR}$ are mounted on left and right front and rear wheels of a front engine and a front drive vehicle, respectively. The left and right rear wheel brakes $B_{RL}$ and $B_{RR}$ are connected to actuators $A_{RL}$ and $A_{RR}$ which are capable of outputting a liquid pressure dependent upon an electrical command signal from a controller C. The left and right front wheel brakes $B_{FL}$ and $B_{FR}$ are connected, in an alternatively switched manner by electromagnetic switchover valves $V_{FL}$ and $V_{FR}$, to actuators $A_{FL}$ and $A_{FR}$ which are capable of outputting a liquid pressure dependent upon an electrical command signal from the controller C, or to a master cylinder M as a liquid pressure generating means which is capable of outputting a liquid pressure dependent upon a manual operation.

The master cylinder M is of a tandem type. A force on brake pedal 1 is input through a vacuum booster 2 to the master cylinder M, and a liquid pressure dependent upon the force on the brake pedal is outputted from first and second output ports $3_1$ and $3_2$ provided in the master cylinder M. The first output port $3_1$ is connected through the electromagnetic switchover valve $V_{FR}$ to the right front wheel brake $B_{FR}$, and the second output port $3_2$ is connected through the electromagnetic switchover valve $V_{FL}$ to the left front wheel brake $B_{FL}$.

Figure 2:
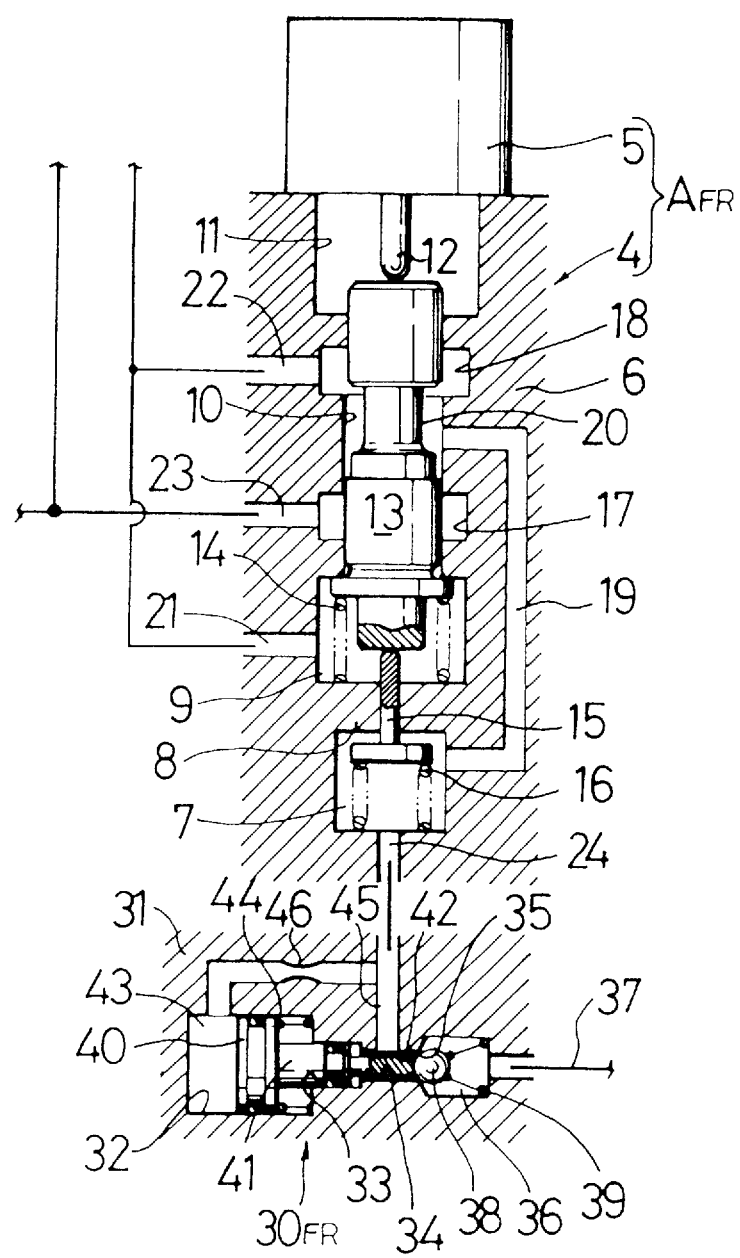
FIG. 2 is a sectional view showing the construction of an actuator and an on-off valve.

Referring to FIG. 2, the actuator $A_{FR}$ corresponding to the right front wheel brake $B_{FR}$ includes a control valve 4 and a linear solenoid 5.

A housing 6 of the control valve 4 includes an output chamber 7; a release chamber 9 having a partition wall 8 interposed between the release chamber 9 and the output chamber 7; a slide bore 10 connected at one end thereof to the release chamber 9; and a working chamber 11 which has a larger diameter than that of the slide bore 10, and which is coaxially connected at one end thereof to the other end of the slide bore 10 and opened at the other end thereof. The linear solenoid 5 has a driving rod 12 and is mounted to the housing 6 such that the driving rod 12 is coaxially disposed within the working chamber 11 to close an outer end of the working chamber 11.

A valve spool 12 is slidably received in the slide bore 10 with one end thereof facing the release chamber 9, and a return spring 14 is mounted under compression within the release chamber 9 between the one end of the valve spool 13 and the partition wall 8. Thus, the valve spool 13 is biased by the spring force of the return spring 14, so that the other end of the valve spool 13 is normally in abutment against the driving rod 12.

A reaction pin 15 is liquid-tightly and slidably mounted through the partition wall 8 and formed at a diameter smaller than that of the valve spool 13. A spring 16 is compressed between one end of the reaction pin 15 facing the output chamber 7 and the housing 6 and has a weak spring force which normally brings the other end of the reaction pin 15 into abutment against the one end of the valve spool 13.

A first annular recess 17 on the side of the release chamber 9 and a second annular recess 18 on the side of the working chamber 11 are axially spaced apart in the slide bore 10. A communication passage 19 is provided in the housing 6 between the first and second annular recesses 17 and 18, and has one end which opens into an inner surface of the slide bore 10. The other end of the communication passage 19 communicates with the output chamber 7. An annular groove 20 is provided in the valve spool 13 and adapted to bring the second annular recess 18 into communication with the communication passage 19, while bringing the annular recess 17 out of communication with the communication passage 19, when the valve spool 13 is in a retracted position as shown in FIG. 2, and to bring the first annular recess 17 into communication with the communication passage 19, while bringing the second annular recess 18 out of the communication with the communication passage 19, when the valve spool 13 is advanced.

The housing 6 is provided with first and second release ports 21 and 22 which lead to the release chamber 9 and the second annular recess 18, respectively; an input port 23 leading to the first annular recess 17; and an output port 24 leading to the output chamber 7. As shown in FIG. 1, the first and second release ports 21 and 22 are in communication with a reservoir R associated with the master cylinder M, and the input port 23 is in communication with a liquid pressure supply source 25.

The liquid pressure supply source 25 includes a pump 26 for pumping a working liquid from the reservoir R, an accumulator 27 connected to the pump 26, and a pressure detector 28 for detecting the pressure in the accumulator 27. The liquid pressure supply source 25 is capable of normally supplying a given liquid pressure.

The linear solenoid 5 permits an axial thrust dependent upon an electrical command signal received from the controller C to be applied from the driving rod 12 to the valve spool 13. By the axial thrust from the linear solenoid 5, the valve spool 13 is urged in a direction to bring the communication passage 19 and thus the output chamber 7 into communication with the first annular recess 17 and the input port 23. On the other hand, a spring force opposing the axial thrust is applied to the valve spool 13 by the return spring 14, and a reaction force from the reaction pin 15 is also applied to the valve spool 13 by the liquid pressure in the output chamber 7 acting on the reaction pin 15 to oppose the axial thrust. In this manner, the valve spool 13 is moved within the slide bore 10 between a retracted position in which it permits the output chamber 7 and thus the output port 24 to be put into communication with the second annular recess 18 and the second release port 22, and an advanced position in which it permits the output port 24 to be put into communication with the input port 23, so as to balance the thrust from the linear solenoid 5 with the spring force of the return spring 14 as well as the reaction force from the reaction pin 15. This causes a braking liquid pressure dependent upon the input electric signal received by the linear solenoid 5, to be outputted from the output port 24.

The output port 24 in the actuator $A_{FR}$ is connected to the electromagnetic switchover valve $V_{FR}$ through an on-off valve $30_{FR}$. The electromagnetic switchover valve $V_{FR}$ is alternatively switchable between a state in which the first output port $3_1$ in the master cylinder M is connected to the right front wheel brake $B_{FR}$ upon deenegerization of the electromagnetic switchover valve $V_{FR}$, and a state in which the on-off valve $30_{FR}$ is connected to the right front wheel brake $B_{FR}$ upon energization of the electromagnetic switchover valve $V_{FR}$.

The on-off valve $30_{FR}$ has a valve housing 31 which is provided with a large-diameter slide bore 32 with one end closed; a small-diameter slide bore 33 which has a smaller diameter than that of the large-diameter slide bore 32 and which is coaxially connected at one end to the other end of the large-diameter slide bore 32; a valve bore 34 which has a smaller diameter than that of the small-diameter slide bore 33 and which is coaxially connected at one end to the other end of the small-diameter slide bore 33; and a valve chamber 36 which is connected to the other end of the valve bore 34. A tapered valve seat 35 is formed between the valve bore 34 and the valve chamber 36, and the other end of the valve bore 34 opens into a central portion of the tapered valve seat 35.

A line 37 is connected to the electromagnetic switchover valve VR and also to the valve chamber 36. Accommodated within the valve chamber 36 are a valve sphere 38 which is seatable on the valve seat 35, and a spring 39 for biasing the valve sphere 38 in a direction to seat it on the valve seat 35.

A large-diameter piston 40 is liquid-tightly and slidably received in the large-diameter slide bore 32 to define a pilot chamber 43 between the piston 40 and a closed one end of the large-diameter slide bore 32. A small-diameter piston 41 is liquid-tightly and slidably received in the small-diameter slide bore 33 and coaxially and integrally connected to the large-diameter piston 40. Moreover, a rod 42 is loosely inserted into the valve bore 34. One end of the rod 42 is integrally and coaxially connected to, or abuts against the small-diameter piston 41, while the other end of the rod 42 abuts against the valve sphere 38. A spring 44 is mounted under compression between the large-diameter piston 40 and a stepped portion provided in the valve housing 31 between the large-diameter slide bore 32 and the small-diameter slide bore 33.

A passage 45 is provided in the valve housing 31 and leads to the output port 24 in the actuator $A_{FR}$. The passage 45 opens into an inner surface of an intermediate portion of the valve bore 34. In addition, the passage 45 is in communication with the pilot chamber 43 through a constriction 46.

In the on-off valve $30_{FR}$ of such construction, when a liquid pressure equal to or higher than a predetermined value is outputted from the output port 24 in the actuator $A_{FR}$, the large-diameter piston 40 is moved against a spring force of the spring 44 in a direction to increase the volume of the pilot chamber 43. This causes the valve sphere 38 to be urged away from the valve seat 35 by the rod 42 to thereby open the on-off valve $30_{FR}$. When the liquid pressure output from the output port 24 in the actuator $A_{FR}$ is lower than the predetermined value, the large-diameter piston 40 is moved in a direction to decrease the volume of the pilot chamber 43 by the spring force of the spring 44, thereby moving the rod 42 to cause the valve sphere 38 to seat on the valve seat 35 to thereby close the on-off valve $30_{FR}$. Moreover, a reduction in liquid pressure in the pilot chamber 43 can be retarded relative to a reduction in liquid pressure in the passage 45 by the constriction 46. The on-off valve $30_{FR}$ is closed after the liquid pressure in the passage 45 is sufficiently reduced, wherein there is no residual pressure left in the valve chamber 36.

The actuator $A_{FL}$ corresponding to the left front wheel brake $B_{FL}$ is of the same construction as is the above-described actuator $A_{FR}$. The actuator $A_{FL}$ is connected to the electromagnetic switchover valve $V_{FL}$ through an on-off valve $30_{FL}$ of the same construction as the above-described on-off valve $30_{FR}$. Actuators $A_{RL}$ and $A_{RR}$ corresponding to the left and right rear wheel brakes $B_{RL}$ and $B_{RR}$ respectively, are also of the same construction as the above-described on-off valve $30_{FR}$.

The operation of the actuators $A_{FL}, A_{FR}, A_{RL}$ and $A_{RR}$ and the switching operation of the electromagnetic switchover valves $V_{FL}$ and $V_{FR}$ are controlled by the controller C. Values detected by an operation-input detector 47 for detecting an operation input of the brake pedal 1 and a detector (not shown) for detecting the behavior of each wheel and the behavior of the vehicle are applied to the controller C. The controller C controls the actuators $A_{FL}$, $A_{FR}$, $A_{RL}$ and $A_{RR}$ and the electromagnetic switchover valves $V_{FL}$ and $V_{FR}$ based on these detection values.

The operation of this embodiment will be described below. During normal braking by the depression of the brake pedal 1, the electromagnetic switchover valves $V_{FL}$ and $V_{FR}$ remain deenergized, and the left and right front wheel brakes $B_{FL}$ and $B_{FR}$ are in a state in which they are connected to the master cylinder M. Therefore, liquid pressure output from the master cylinder M in accordance with the depression of brake pedal 1, is applied to the left and right wheel brakes $B_{FL}$ and $B_{FR}$. An electrical command signal corresponding to the brake operation input detected by the operation-input detector 47, is applied to the actuators $A_{RL}$ and $A_{RR}$, and liquid pressure output from the actuators $A_{RL}$ and $A_{RR}$ in correspondence to the brake operation input is applied to the left and right rear wheel brakes $B_{RL}$ and $B_{RR}$, respectively.

In this way, during the normal braking in a condition in which the master cylinder M has been connected to the left and right front wheel brakes $B_{FL}$ and $B_{FR}$ by the electromagnetic switchover valves $V_{FL}$ and $V_{FR}$, the actuators $A_{FL}$ and $A_{FR}$ corresponding to the left and right front wheel brakes $B_{FL}$ and $B_{FR}$ are in a non-operative state. For this reason, the output ports 24 in the actuators $A_{FL}$ and $A_{FR}$ are in communication with the reservoir R, and the output liquid pressure from the actuators $A_{FL}$ and $A_{FR}$ is lower than the predetermined value and hence, the on-off valves $30_{FL}$ and $30_{FR}$ are in a closed state. Thus, even if there is a seal failure or the like in the electromagnetic switchover valves $V_{FL}$ and $V_{FR}$, the working liquid cannot leak from the wheel brakes $B_{FL}$ and $B_{FR}$ or the master cylinder M toward the actuators $A_{FL}$ and $A_{FR}$.

When the possibility of a locking of either one of the left and right front wheels, e.g., the right front wheel is increased, the electromagnetic switchover valves $V_{FR}$ corresponding to the right front wheel is energized to disconnect the right front wheel brake $B_{FR}$ from the master cylinder M and to connect the right front wheel brake $B_{FR}$ to the on-off valve $30_{FR}$, and an electrical command signal for carrying out an anti-lock brake control is applied from the controller C to the actuator $A_{FR}$. When a liquid pressure is thus outputted from the actuator $A_{FR}$, the on-off valve $30_{FR}$ is opened, thereby permitting the liquid pressure output from the actuator $A_{FR}$ to be applied to the right front wheel brake $B_{FR}$. When the possibility of a locking of the left front wheel is increased, the electromagnetic switchover valve $V_{FL}$ corresponding to the left front wheel is energized, and an electrical command signal for carrying out an anti-lock brake control is applied from the controller C to the actuator $A_{FL}$. Thus, liquid pressure is outputted from the actuator $A_{FL}$, whereby the on-off valve $30_{FL}$ is opened to permit the liquid pressure output from the actuator $A_{FL}$ to be applied to the left front wheel brake $B_{FL}$. Further, when the possibility of locking of both the left and right front wheels is increased, both the electromagnetic switchover valves $V_{FL}$ and $V_{FR}$ are energized, and the output liquid pressure from the actuators $A_{FL}$ and $A_{FR}$ are applied to the left and right front wheel brakes $B_{FL}$ and $B_{FR}$, respectively.

On the other hand, output liquid pressure from the actuators $A_{RL}$ and $A_{RR}$ is applied to the left and right rear wheel brakes $B_{RL}$ and $B_{RR}$, respectively and hence, it is possible to carry out an anti-lock brake control by regulating the output liquid pressures from the actuators $A_{RL}$ and $A_{RR}$.

In conducting a traction control, an automatic brake control and a braking-force distribution control, both of the electromagnetic switchover valves $V_{FL}$ and $V_{FR}$ are energized as in the above-described anti-lock brake control and thus, regulated output liquid pressures from the actuators $A_{FL}$ and $A_{FR}$ are applied to the left and right front wheel brakes $B_{FL}$ and $B_{FR}$, respectively.

In the above-described embodiment, the output liquid pressure from the master cylinder M is applied respectively to the left and right wheel brakes $B_{FL}$ and $B_{FR}$ during normal braking in consideration of a decreasing pressure in the liquid pressure supply source 25 due to a relatively large load on a front portion of the vehicle because of the front engine and front drive vehicle. Alternatively, in the case of a relatively large load on a rear portion of a vehicle as in a rear engine and rear drive vehicle, the output liquid pressure from the master cylinder M may be applied to the left and right rear wheel brakes $B_{RL}$ and $B_{RR}$ during the normal braking.

In alternative embodiment, the switchover valve means may be composed of a switchover valve interposed between the master cylinder and the wheel brakes, and a switchover valve interposed between the on-off valve and the wheel brakes.

Although the embodiment of the present invention has been described in detail, it will be understood that the present invention is not limited to the above-described embodiment, and various modifications in design may be made without departing from the spirit and scope of the invention defined in claims.

What is claimed is:

1. A brake system for a vehicle, comprising:

(a) a liquid pressure generating means for generating a liquid pressure dependent upon a manual operation;

(b) controller means for receiving signals indicative of vehicle operating conditions and for generating electrical command signals as a function thereof;

(c) actuator means, having an output port and operatively coupled to said controller means, for receiving an electrical command signal from said controller means and for outputting a liquid pressure from said output port, dependent upon the electrical command signal from said controller means;

(d) a reservoir communicating with said output port of said actuator means when said actuator means is non-operative;

(e) switchover valve means, operatively coupled to said controller means, for receiving electrical command signals therefrom and for switching between a state in which a wheel brake is connected to said liquid pressure generating means, and a state in which the wheel brake is connected to said output port of said actuator means as a function of the electrical command signal applied thereto; and (f) an on-off valve having a pilot chamber which communicates with said output port of said actuation means, said on-off valve connected between said output port of said actuator means and said switchover valve means, and said on-off valve being opened when the liquid pressure in said pilot chamber is equal to or greater than a predetermined value.

2. A brake system as set forth in claim 1, wherein the connection of the output port of said actuator means to said on-off valve includes means for slowing the operation of said on-off valve with respect to the output of said actuator means.

3. A brake system as set forth in claim 2, wherein said slowing means is a constriction in the connection between the output port of said actuator means and said on-off valve.

* * * * *